(12) United States Patent
Paniagua Olaechea

(10) Patent No.: US 7,053,318 B2
(45) Date of Patent: May 30, 2006

(54) MACHINE FOR WEIGHING AND SORTING PIECES OF FRUIT AND THE LIKE

(76) Inventor: Rosalina Paniagua Olaechea, Plaza del Reino, 4. 8°5², Alzira (ES) 46600

( * ) Notice: Subject to any disclaimer, the term of this patent is extended or adjusted under 35 U.S.C. 154(b) by 237 days.

(21) Appl. No.: 10/611,040

(22) Filed: Jun. 30, 2003

(65) Prior Publication Data

US 2004/0045744 A1 Mar. 11, 2004

(30) Foreign Application Priority Data

Aug. 13, 2002 (ES) ................................ 200201910

(51) Int. Cl.
*G01G 19/00* (2006.01)

(52) U.S. Cl. .................. 177/103; 209/521; 209/592; 177/145

(58) Field of Classification Search .............. 177/103, 177/145; 209/521, 592
See application file for complete search history.

(56) References Cited

U.S. PATENT DOCUMENTS

| | | | | | |
|---|---|---|---|---|---|
| 2,112,823 | A | * | 4/1938 | Breuilh ....................... | 209/646 |
| 2,574,761 | A | * | 11/1951 | Rutherford ................... | 99/542 |
| 2,712,376 | A | * | 7/1955 | Bruestle ...................... | 198/431 |
| 4,413,690 | A | * | 11/1983 | Peterson ...................... | 177/54 |
| 4,420,051 | A | * | 12/1983 | Furuta et al. ............. | 177/25.12 |
| 5,813,195 | A | * | 9/1998 | Nielsen et al. ................ | 53/443 |
| 6,787,712 | B1 | * | 9/2004 | Asai et al. ............... | 177/25.18 |

* cited by examiner

*Primary Examiner*—Randy W. Gibson
(74) *Attorney, Agent, or Firm*—Darby & Darby

(57) ABSTRACT

The machine has a regular structure symmetrical with respect to a central axis and provided with limiting end faces, said structure being disposed with its horizontal axis rotatably supported on its axis of symmetry on the frame of the machine, and bearing a plurality of longitudinal frames in the direction of the generatrices, on which are incorporated the "cups" or buckets carrying the pieces of fruit or the like, each of said "cups" or buckets being freely rotatable on a horizontal axis, and the machine having means for the rotatable support on its horizontal axis of said structure carrying the "cups" for the pieces of fruit, and also means for effecting the rotation of said structure on its horizontal axis.

8 Claims, 5 Drawing Sheets

MACHINE FOR WEIGHING AND SORTING PIECES OF FRUIT AND THE LIKE

SPECIFICATION

The present invention is intended to disclose a machine for weighing and sorting pieces of fruit and the like, which has significant characteristics of novelty and of inventive step.

The machine of the present invention is intended to carrying out the weighing of the pieces of fruit or other fruit and vegetable products, provided in bulk, in order to be able to proceed with the filling of the boxes for storage and distribution of said pieces of fruit or the like at the planned weights.

Machines for carrying out said work are known at present in which there are different types of driving devices for actuating a series of so-called "cups" or buckets receiving the bulk pieces of fruit, which are transported along the machine, passing through one or more weighing stations in which the buckets are allowed to rest for a short time on loading cells which indicate the precise weight of each of the carrier buckets, subtracting the known weight of the actual bucket, that is to say, the tare, said weight being recorded in a central control unit, and then passing to a zone for selective tipping of said buckets onto the discharge conveyor belts intended for loading the storage and distribution boxes. Owing to the recording and storage of the weight of each of the individual buckets which is carried out, it will be possible to combine, by means of the actual automated control system, the discharge of said buckets in order to obtain the necessary weights. However, the devices known at present for carrying out said work are extraordinarily complex, and expensive to manufacture and maintain.

The present invention is intended to disclose a machine of completely new and advantageous constitution which makes it possible to obtain characteristics of great simplicity and efficiency in the operation of the machine for weighing and sorting fruit and vegetable products.

Essentially, the present invention is based on the formation of a drum or cage with a regular structure symmetrical with respect to a central axis and provided with limiting end faces, said structure being disposed with its horizontal axis rotatably supported on its axis of symmetry on the frame of the machine, and bearing a plurality of longitudinal frames in the direction of the generatrices, on which frames are incorporated the "cups" or buckets carrying the pieces of fruit or the like, each of said "cups" or buckets being freely rotatable on a horizontal axis, and the machine having means for the rotatable support on its horizontal axis of said structure carrying the "cups" for the pieces of fruit, and also means for effecting the rotation of said structure on its horizontal axis. In particular it will assume a generally cylindrical shape, rotatable on its horizontal axis, said drum or cage bearing a plurality of frames disposed according to the generatrices of the cylindrical shape and carrying the different buckets receiving the loads of fruit or other articles, so that said buckets are individually rotatable on the respective frames in order to maintain their horizontal position, and are controllable with regard to the tipping onto conveyor belts disposed within the volume formed by the cylindrical drum.

Preferably, said cylindrical drum or cage will be formed by two end rings which form the bases of said cylindrical structure, and with which will be associated longitudinal members in the form of thick bars or the like for firmly connecting said end rings, which will preferably have respective toothed crowns for their rotational driving by means of a single drive system, preferably composed of a common reduction motor with a shaft carrying the pinions which engage with the end toothed crowns or gears. The mounting of the cage assembly in a rotatory arrangement may be effected preferably by means of support roller systems which will act on the lower part, for example the lower half, of the end crowns, and another series of upper rollers which will act on the inner part of the same crowns. By means of this exposition, practical and rapid rotatable mounting of the rotary drum of the weighing and sorting machine is facilitated.

It should be understood, however, that both the precise constitution of the rotatory drum and its system of rotatable support and actuation in rotation may vary within wide limits, using arrangements known in the art.

For greater understanding thereof, by way of non-limiting example, drawings of an embodiment of the machine of the present invention are appended by way of example.

DETAILED DESCRIPTION OF THE INVENTION

Figure 3:
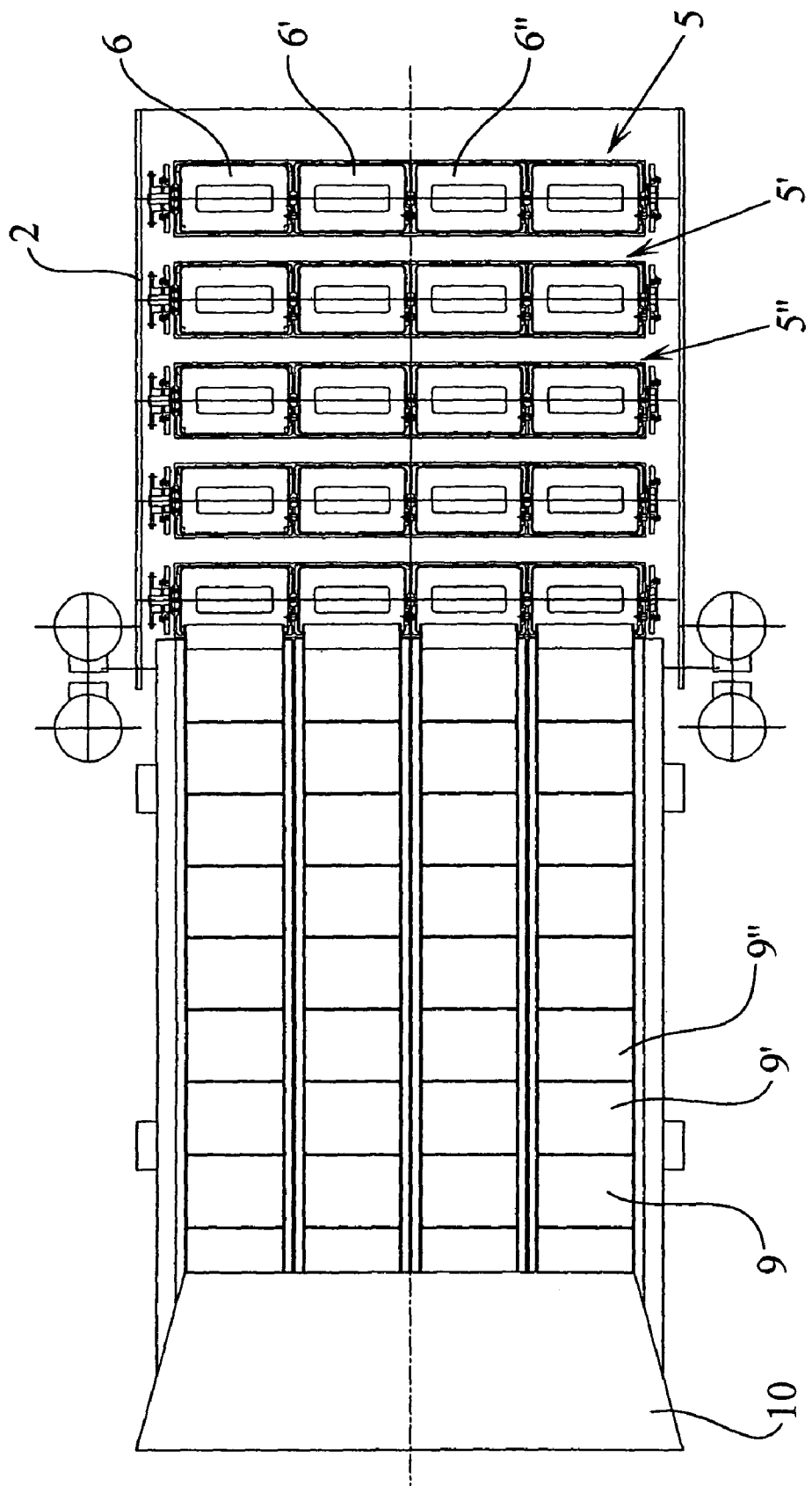
FIG. 3 shows a plan view.
Figure 4:
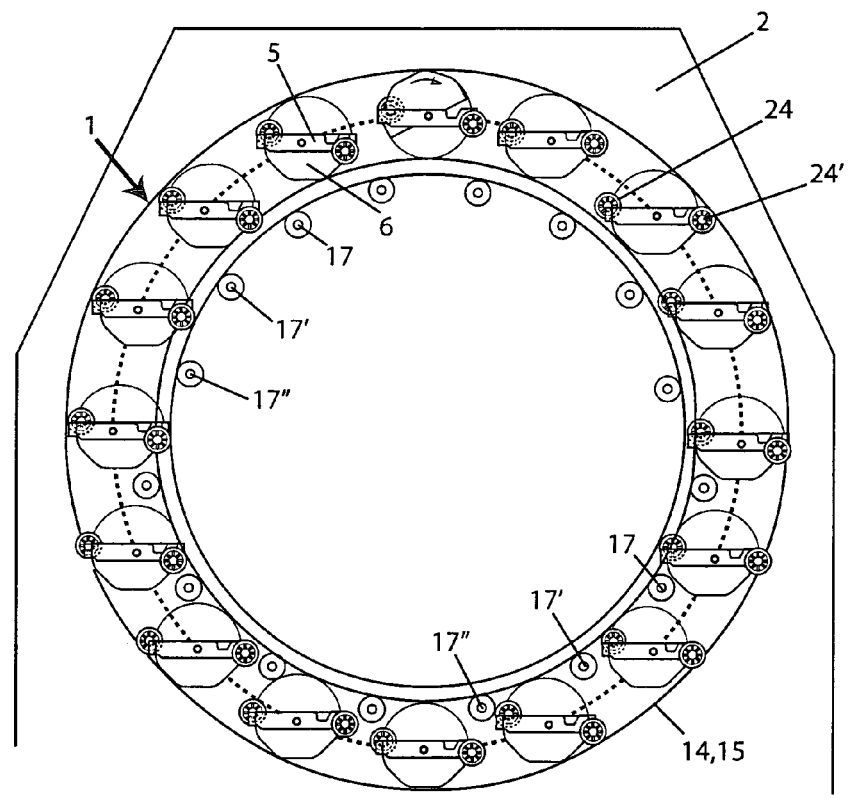
FIG. 4 illustrates a portion of another embodiment of the present invention.
Figure 6:
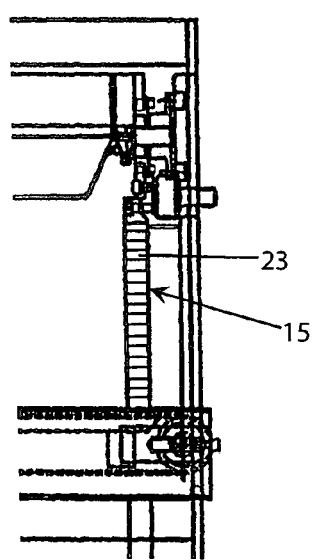
FIG. 6 illustrates a portion of the machine depicted in FIG. 1.
Figure 5:
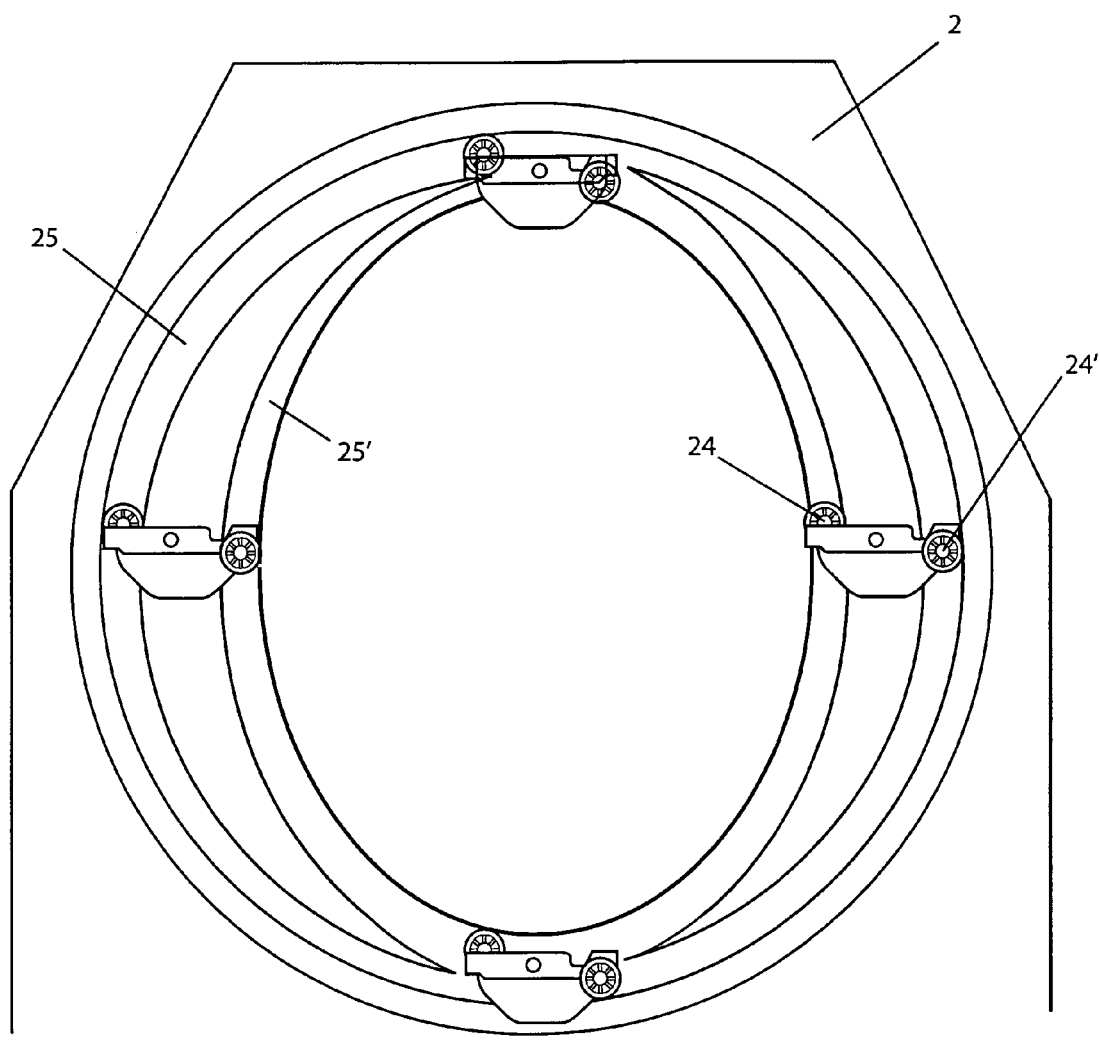
FIG. 5 illustrates a partial side view of an embodiment of the present invention.

As shown in the figures, the machine of the present invention has as a fundamental characteristic that of having a drum or cage of general structure symmetrical with respect to a central axis and provided with limiting end faces, especially a generally cylindrical structure, rotatable on its geometric axis, being incorporated in a supporting frame 2 equipped with adjustable legs such as 3 and 4 and having a plurality of frames in the direction of the generatrices such as those indicated by the numbers 5, 5', 5" in FIG. 3, which are intended to support alignments of individually rotatable "cups" or buckets such as those indicated by the numbers 6, 6', 6" in the same FIG. 3.

The machine has a lower weighing zone 7 in which will be arranged stops such as those indicated diagrammatically by the number 8 for the support of the "cups" or buckets carrying the pieces of fruit on weighing platforms, the seatings of the axes of said zones permitting the kinematic displacements on the drum and on the platforms so that weighing can be carried out without stopping the rotatory movement of the drum or cage of the machine.

The feeding of pieces of fruit in bulk is effected by means of a system of belts with scoops or the like such as those indicated by the numbers 9, 9', 9" in FIG. 3, with a feed hopper 10. Said scoop feeder belts carry out the filling in succession of the different "cups" or buckets 6, 6', 6" which will then be weighed in the station 7 and which, on continuation of the rotatory movement of the cage 1, shown as anticlockwise in the figure, will subsequently reach the upper part in which the said "cups" will then be selectively discharged onto the belts conveying to the distribution boxes and indicated by the numbers 11, 12 and 13, it being understood that their number is variable.

Figure 1:
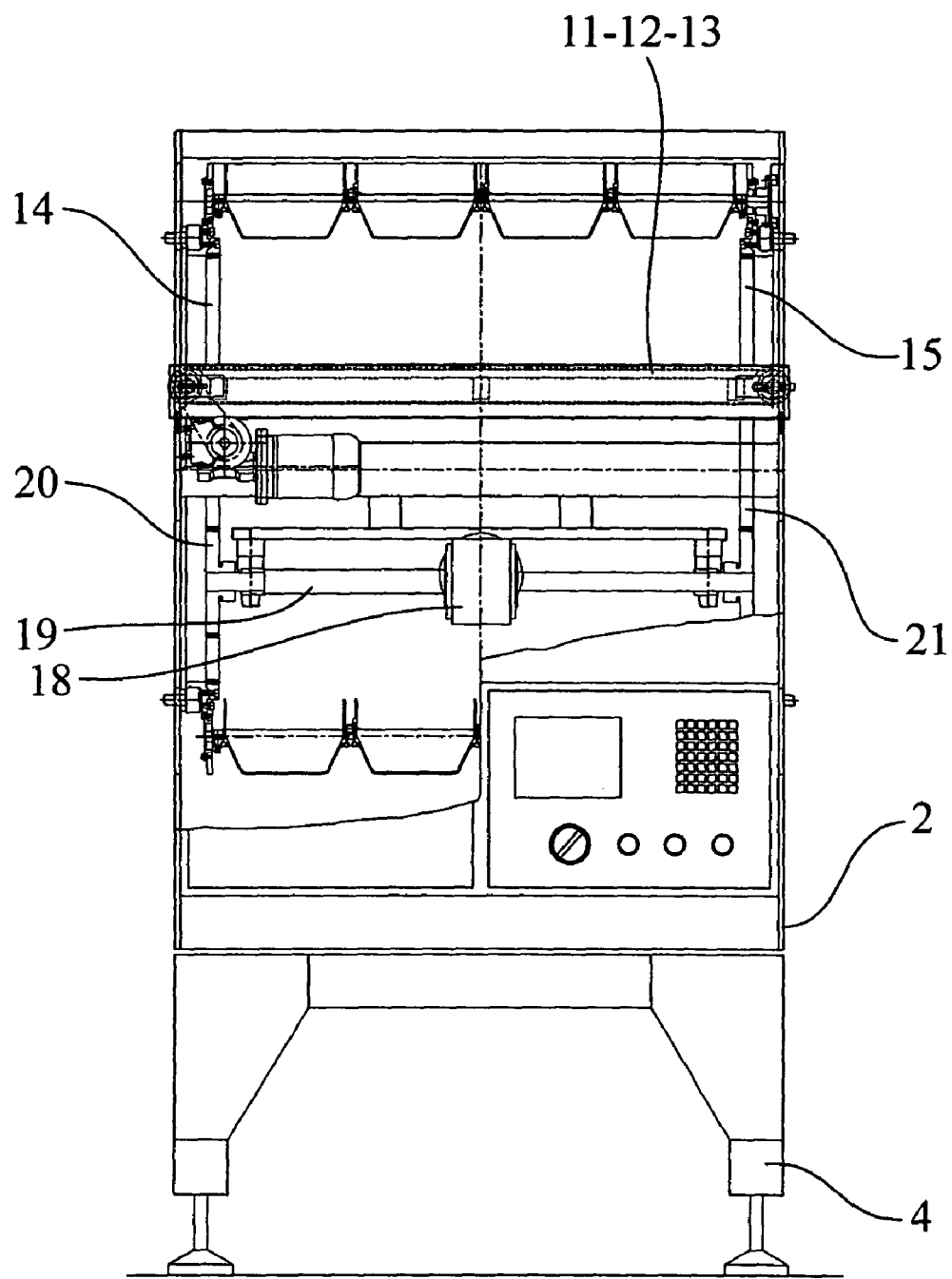
FIG. 1 shows diagrammatically a front view with partial sections of the machine of the present invention.
Figure 2:
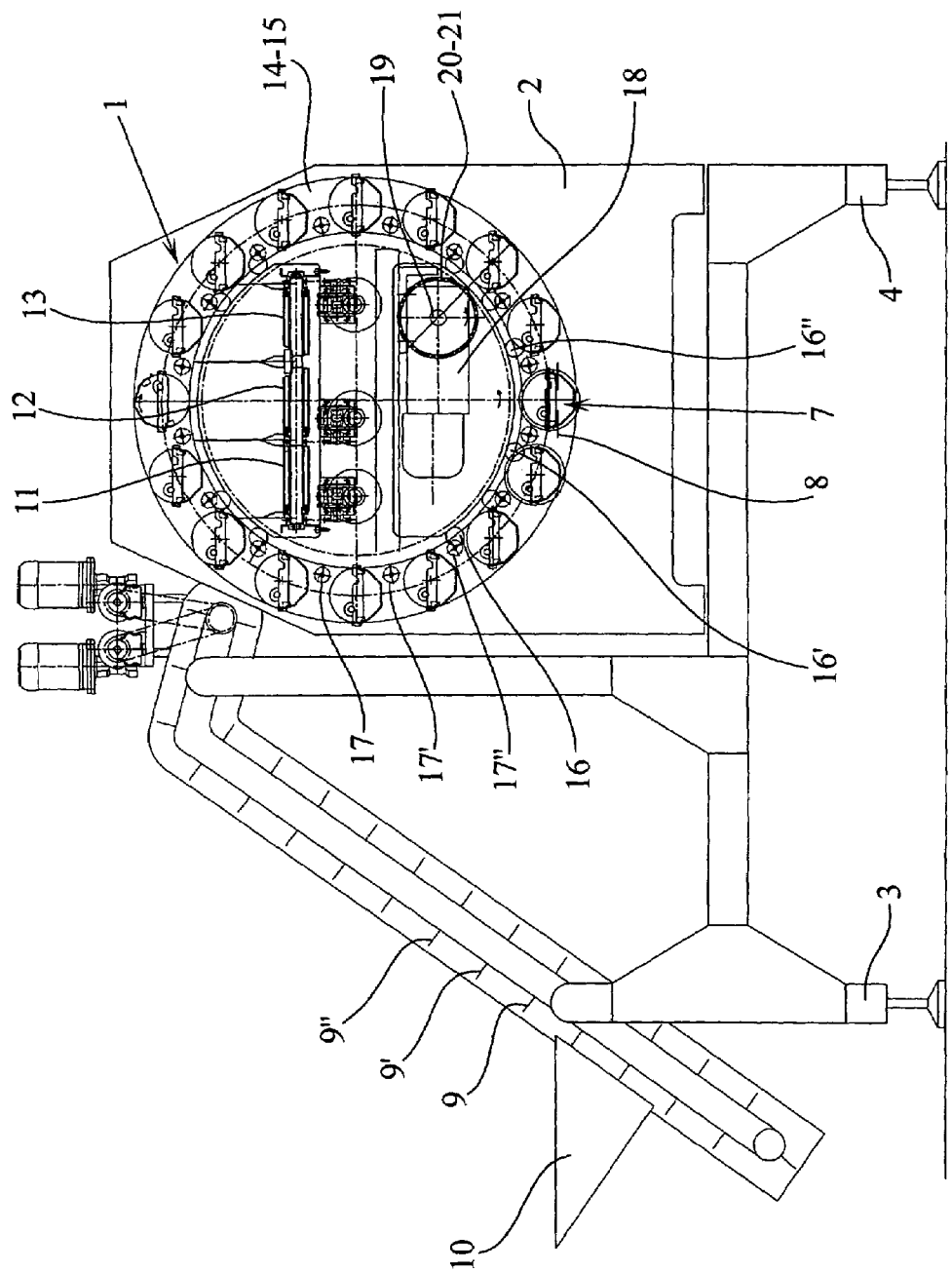
FIG. 2 shows a diagrammatic view in side elevation of the same machine.

The drum or cage 1 will be formed, for example, by means of two end rings shown diagrammatically by the numbers 14 and 15 in FIG. 1, and interconnected with one another by means of thick connecting bars indicated diagrammatically by the numbers 16, 16', 16" in FIG. 2 to form a rigid assembly preferably supported by means of assemblies of support rollers such as 17, 17' and 17" which may be distributed over the entire outer periphery of the end rings or may be distributed partially on the outer periphery and on the inner periphery, for example, on the lower half of the outer periphery and on the upper half of the inner periphery, permitting easy and well centred support of the assembly of the rotatory drum 1 by very simple technical means.

The actuation of the drum 1 in rotation will preferably be effected by means of a reduction motor assembly 18 with a single traverse shaft 19, and end crowns 20 and 21 meshed with respective crowns 22 and 23 rigidly connected to the end rings 14 and 15.

It is also to be understood that the system for actuation of the drum 1 in rotation may be variable within wide limits.

The different "cups" or buckets 6, 6', 6" are rotatable on horizontal axes to allow their general horizontal position, being also equipped with individual tipping mechanisms controlled from the centralized controller system which will cause them to be tipped onto the belt previously selected from among 11, 12 and 13 in order to obtain the desired individual weight.

The frames 5, 5', 5" will preferably be equipped with a system of rollers 24, 24' which run along fixed guides 25, 25', of supporting frame 2, which permit their horizontal positioning by positive means along the whole of their path.

The invention claimed is:

1. A machine for weighing and sorting items, comprising:
   a supporting frame having a rotatable support;
   a cage carrying individual cups, which receive a load of items from an assembly of conveyor belts coupled to the machine, comprising two end rings disposed at opposite ends of interconnecting bars that are attached along the circumference of the end rings so as to form a rigid structure symmetrical with respect to a central axis;
   said cage being disposed with a cage horizontal axis supported on the rotatable support of the supporting frame;
   a plurality of longitudinal frames connected to the cage in the direction of the interconnecting bars;
   the carrying cups disposed on the longitudinal frames, wherein each of said cups is freely rotatable on a carrying cup horizontal axis; and
   a motor on the supporting frame in mechanical communication with the cage so as to rotate the cage on the cage horizontal axis.

2. A machine for weighing and sorting items according to claim 1, wherein the cage is of generally cylindrical shape.

3. A machine for weighing and sorting items, comprising:
   a supporting frame for an assembly carrying individual cups which receive their load of items by means of an assembly of conveyor belts coupled to the machine, including a regular structure symmetrical with respect to a central axis and provided with limiting end faces;
   the structure being disposed with its horizontal axis rotatably supported on its axis of symmetry on the frame of the machine;
   a plurality of longitudinal frames connected to said structure in the direction of its generatrices, on which are incorporated the cups carrying the items, each of said cups being freely rotatable on a horizontal axis;
   the structure bearing the frames of the cups is equipped with end rings on its bases interconnected by means of bars in an arrangement of generatrices for the rigid connection of said structure;
   the machine having means for the rotatable support on its horizontal axis of said structure carrying the cups for the items; and
   means for effecting the rotation of said structure on its horizontal axis.

4. A machine for weighing and sorting items, according to claim 3, further comprising:
   respective toothed crowns coupled to the end rings of the structure to permit the rotation of said structure on its horizontal axis by the action of a drive system comprising a reduction motor and pinions meshed with said crowns.

5. A machine for weighing and sorting items according to claim 1, wherein the rotatable support comprises an assembly of support rollers which act on a periphery of the end rings.

6. A machine for weighing and sorting items according to claim 5, wherein the support rollers act upon an outer part of the end rings at a zone which corresponds to a lower half thereof and on an inner part of the end rings in a zone which corresponds to an upper half thereof.

7. A machine for weighing and sorting items according to claim 1, wherein the longitudinal frames are equipped with pairs of rollers at each end for guiding them inside guides of the supporting frame of the machine which compel said longitudinal frames to maintain their horizontal position over their entire path.

8. A machine for weighing and sorting items, comprising:
   a supporting frame having a rotatable support;
   a cage carrying individual cups, which receive a load of items from an assembly of conveyor belts coupled to the machine, comprising two end rings disposed at opposite ends of interconnecting bars that are attached along the circumference of the end rings so as to form a rigid structure symmetrical with respect to a central axis;
   said cage being disposed with a cage horizontal axis supported on the rotatable support of the supporting frame;
   a plurality of longitudinal frames connected to the cage in the direction of the interconnecting bars;
   the carrying cups disposed on the longitudinal frames, wherein each of said cups is freely rotatable on a carrying cup horizontal axis;
   a motor on the supporting frame in mechanical communication with the cage so as to rotate the cage on the cage horizontal axis; and
   respective toothed crowns coupled to the end rings of the cage to permit the rotation of the cage by the action of the motor.

* * * * *